Sept. 12, 1933.  P. L. McKEE  1,926,159
GREENHOUSE CONSTRUCTION
Filed June 8, 1931
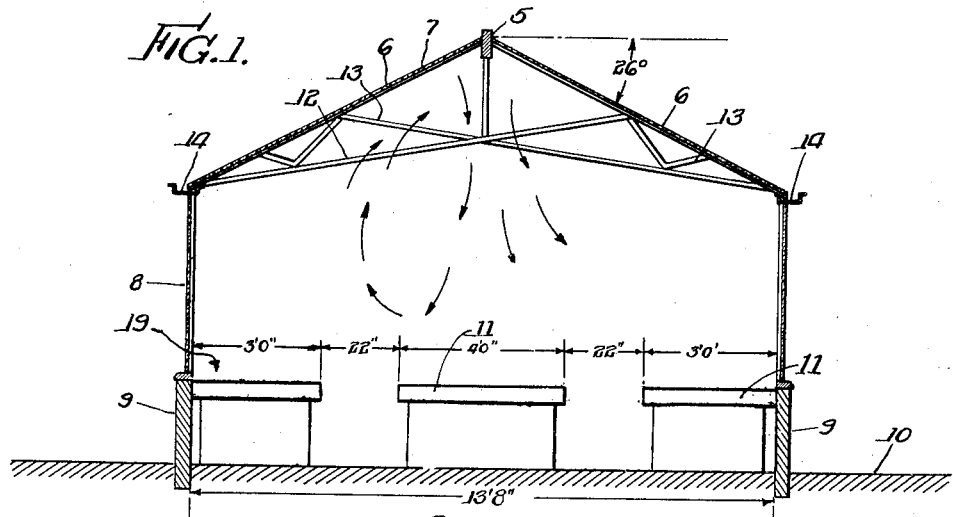
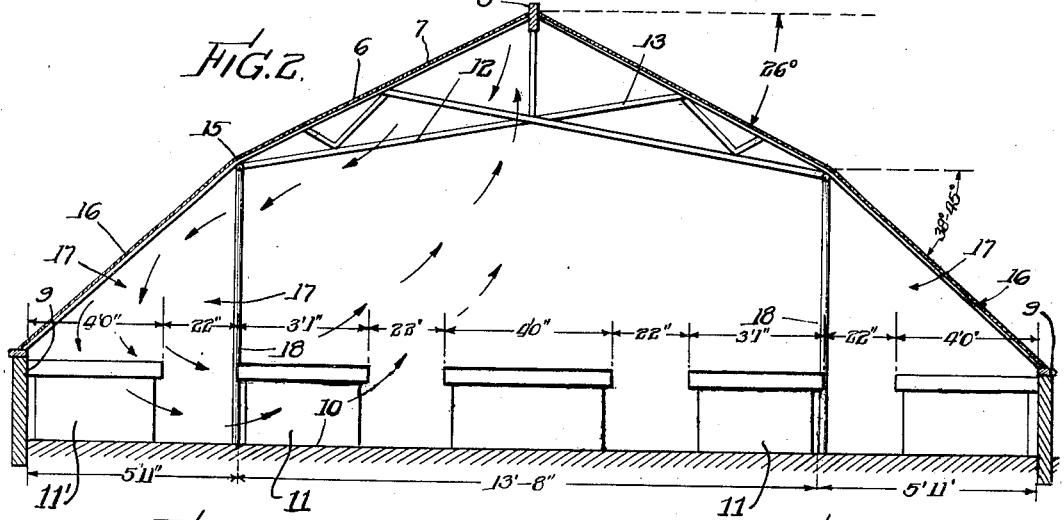
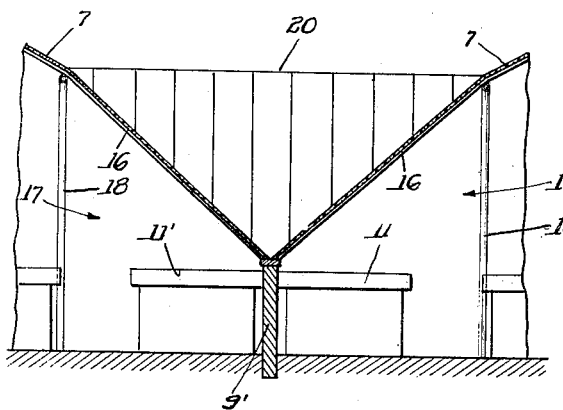
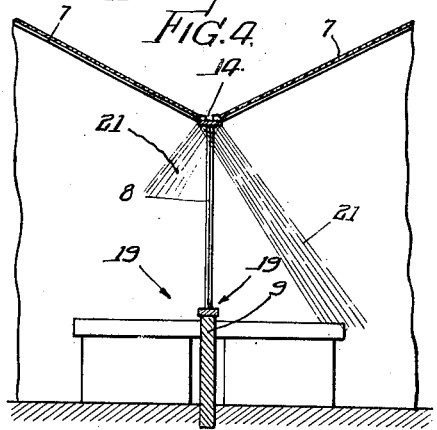
Inventor:
Philip L. McKee
By: Chever, Cox & Moore attys.

Patented Sept. 12, 1933

1,926,159

UNITED STATES PATENT OFFICE 1,926,159

GREENHOUSE CONSTRUCTION

Philip L. McKee, Pana, Ill.

Application June 8, 1931. Serial No. 542,756

7 Claims. (Cl. 47—17)

This invention relates to greenhouse construction.

The primary object of the invention is to provide a new and improved greenhouse construction which provides better circulation of air throughout the greenhouse, which eliminates shadows in the greenhouse, which permits better positioning of the greenhouse benches, which can be heated at a lower cost, and which can be built at a lower cost than present greenhouses.

A further object of the invention is to provide a greenhouse which has a greater bench area as compared with the glass area than conventional greenhouses; which eliminates the use of gutters, which has a better bench arrangement permitting easy access to plants on the benches, and which is more rigid and efficient than conventional greenhouses.

A still further object of the invention is to provide a new greenhouse construction which provides a combination propagating and growing greenhouse and which has side extensions acting as struts or tension members for bracing the greenhouse.

Numerous other objects and advantages will be apparent throughout the progress of the following specification.

The accompanying drawing illustrates a selected embodiment of the invention and the views therein are as follows:

Fig. 1 is a cross-sectional view of a greenhouse of the conventional type and showing an arrangement of benches.

Fig. 2 is a detail sectional view of the improved greenhouse showing the positioning of the benches therein.

Fig. 3 is a detail sectional view showing the manner in which a plurality of greenhouses of the improved construction may be connected together.

Fig. 4 is a detail sectional view showing the manner in which conventional greenhouses are connected together.

Referring to the drawing, 5 designates the usual longitudinal ridge bar or ridge pole which extends from one end of the greenhouse to the other and from which the upper ends of the roof rafters 6 of the roof 7 are supported, the lower ends of these rafters being supported on the studs or side walls 8. The side walls 8 are composed of the usual spaced studs of relatively small dimension, and the usual glass panels. These walls are supported on the usual foundation 9 which extends upwardly from the ground 10 a distance substantially as high or slightly higher than the top of the conventional greenhouse benches 11.

The roof is further supported by trusses or crossbeams 12 which comprise a plurality of interconnected members 13.

The usual gutter 14 is arranged at a point where the side walls 8 connect with the roof 7.

For the purpose of explaining the invention, a conventional greenhouse of a particular size has been selected and three benches 11 (as shown) are arranged therein, there being walks or passages provided to permit easy access to the plants on the benches. It will thus be noted that the bench area in the conventional greenhouse is relatively smaller as compared with the glass area than the bench area as compared with the glass area in the present greenhouse, the glass area in each instance being that part of the greenhouse which extends above the foundation walls. It is also to be pointed out that in the conventional greenhouse construction it is necessary to build two types of greenhouses, one in which the plants are propagated, and another in which the plants are grown.

The present invention has material advantages over the conventional greenhouse construction in that the usual side walls 8 of the greenhouses are swung outwardly at a point indicated at 15, Fig. 2, to provide an additional glass roof surface 16. While the floor area of the new greenhouse is somewhat increased over the area of conventional greenhouses, the glass area has not been increased to any extent, if at all, while the bench area has been greatly increased.

The greenhouse comprises a continuous unbroken glass roof and glass side walls. The roof 7 extends in sections on opposite sides of the central ridge bar or ridge pole and connects with the side walls 8 which are extended outwardly and uninterruptedly to provide a continuous unbroken roof. The rafters 6 may be made co-extensive with the studding of the side walls 8 and may be made in one piece or spliced together at the joint. While the roof, including the side walls, has a hip joint, the roof is uninterrupted, that is, one part of the roof is not offset from the other.

The swinging out of the side walls 8, to provide additional roof surface 16, provides additional growing compartments or rooms 17 in which additional benches 11' may be arranged. These benches, it will be observed by referring to Fig. 2, are relatively close to the glass surface 16 and therefore may be used for the purpose of propagating plants, as it is well known in this art that to propagate properly the plants must be relatively close to the glass. In growing, however, the plants should not be too close to the glass, and therefore the space between the vertical walls or pilasters 18 is used for growing purposes.

Furthermore, in the conventional greenhouse, it is relatively hard to maintain the proper temperature and to maintain a proper air circulation inside of the greenhouse. Air in the conventional greenhouse circulates as shown by the directional arrows in Fig. 1 leaving still pockets as indicated by the arrow 19 in Fig. 1. In the improved greenhouse much better circulation is obtained, the air circulating as indicated by the arrows shown in Fig. 2. Also, the present construction eliminates the use of gutters which were necessary in the conventional greenhouse construction. If gutters were not supplied on conventional greenhouses, the drain water from the roof would leak down on to the vertical side walls of the greenhouse and become frozen in the winter time, often resulting in the breakage of glass.

In carrying out the invention it has been found advantageous and practical that the present pitch of the roof remains at about 26° from horizontal, and the pitch of the lower portion 16 of the roof be about 38° to 45° from horizontal. This formation of the roof which comprises the roof proper 7 and the roof extension 16, acts as a brace when properly secured to the side walls 9. In the present construction, however, inasmuch as the roof line extends down to the top of the foundation walls 9, the water will drip directly down the foundation walls. These foundation walls may be made of concrete, brick, wood, or any other desirable material.

This particular construction of the roof, having one part receding at a greater angle than the other part and having the sloping portion tied to the foundation walls which are fastened to the floor, and which has a column fastened to the floor and the upper part of the sloping extension, provides a truss arrangement which permits a greenhouse to be built of greater width than the conventional greenhouses without increasing the weight or size of the members, the side extension being connected to the roof proper and to the foundation walls and supported by a relatively light column or pilaster, which acts in effect as struts or tension members, and braces the greenhouse in a manner similar to guy wires.

When a plurality of greenhouses are to be connected together as is often desirable, the adjacent roofs of adjacent greenhouses are supported on the foundation walls 9', Fig. 3, and a gable 20 may be provided to make a glass enclosure over the passageway between greenhouses. In the conventional multiple construction shown in Fig. 4, the greenhouses are connected at their eaves with a gutter 14 arranged therebetween. This gutter must be relatively wide to accommodate the drain water from the roofs of adjacent greenhouses and will cause a shadow inside of the greenhouses as indicated by the numeral 21 in Fig. 4. The new construction, therefore, in addition to the various other advantages, overcomes shadows by the elimination of gutters.

In conventional greenhouses which are connected together as shown in Fig. 4, the space between the pilasters is usually left open. Therefore, if plant disease should get into one house it would be very easily communicated to the others. If disease is once in any part of the house, it is readily carried throughout the entire space, and in order to eliminate this disease the owner is obliged to fumigate and apply chemicals throughout the entire space, which may include as many as thirty or forty buildings. If the space between the houses is closed, the amount of framework and material required is very expensive and an immense amount of shadow would be thrown inside of an adjoining greenhouse.

In order to have each house separated from the others the houses are usually built independent of each other so that the owner may carry different temperatures in each house and also keep plant diseases isolated so that they will not be communicated from one house to the other. When the houses are built independent of each other the owner can keep the temperatures required in each house independent of any other house and can also control plant disease independent of the other buildings. The cost of the separate houses, however, is very high and as they have glass on all sides of them, the cost of heating and maintenance is very large. With the independent houses, the owner must build small greenhouses which are used to connect one house with another. These connecting houses are used only as passageways and have no other value as they do not produce anything. Therefore, the majority of the greenhouses at the present time are built as independent units which permits control of temperature, control of disease, and the elimination of shadows from the inside walls and gutters.

With the improved type of greenhouses which are connected together as shown in Fig. 3, all the advantages of separate and independent greenhouses are maintained as to heating, maintenance, temperature control, and the fighting of disease. On the other hand, all the disadvantages have been eliminated as the buildings are relatively close together and can be worked more efficiently as the operators do not need to travel from one independent building to another. Also, the first cost of the improved buildings is considerably less than a plurality of independent buildings due to the fact that only one small partition 9' is required between houses with the connecting gable 20.

Practically every grower or florist grows several varieties and kinds of flowers. The price of flowers is always higher for certain holidays such as Christmas, Easter, etc., and each grower tries to arrange his production so that he will have a good supply at these times. If he is obliged to grow all of his various kinds of flowers in connected houses of the conventional type, as shown in Fig. 4, he must maintain the same temperature throughout. Due to natural causes it often happens that some varieties will grow faster than they should and come into bloom before the holiday arrives, or they will grow more slowly and not come into bloom until after the holiday. If these particular plants are isolated in an independent house, this condition can be controlled. If the grower sees that they are growing too rapidly, he can keep a lower temperature and retard the growth, while on the other hand if they appear to be late he can force their growth. This is a very important thing to the producer. He is unable to have any control in the ordinary type of greenhouse built as shown in Fig. 4, while with the new construction, he can have connected houses as shown in Fig. 3 and control the growth in each unit separate from each other unit. At the same time the grower has a low priced building with all of the advantages of the connected style of house. The saving of ground area required for buildings of the present type plus the saving of time spent in travelling from one unit to another is an immense item. The use of the present construction also provides full sunlight without shadows from the eaves.

For the purpose of further illustrating the invention it will be assumed that the distance between the foundation walls 9 in Fig. 1, and the distance between the pilasters 18 in Fig. 2 are the same, both being 13'—8", which width has been desirable in smaller greenhouses of certain types. By swinging out the walls 8 to provide the additional roof surface 16, it has been found desirable to make the dimension between the foundation wall 9 in Fig. 2, and the pilaster 18 approximately 5'—11". Thus, five rows of benches having 22" passageways between rows may be arranged in the new greenhouse construction without increasing the glass area of the greenhouse, while only three rows of benches with 22" passageways can be used in the conventional greenhouse construction.

Three or four feet is the maximum width of the bench that can be used advantageously if access is only provided on one side. Therefore, in the greenhouse construction shown in Fig. 1 the center bench may be made 4' while the side benches are made 3', there being 22" passageways arranged between the center benches and the outside benches. Thus, in Fig. 1 the total bench area is 10' across the greenhouse. In Fig. 2 the side benches 11 can be made 3'—1" in width because they are free to overlap the pilasters 18. However, in order to increase the bench area within the greenhouse, two 6' benches may be arranged within the 13'—8" space with a 20" passageway between the benches leaving a 22" passageway exteriorly of the end benches to permit a worker to work from both sides of the bench. This latter arrangement is impossible in the construction shown in Fig. 1 as there would be no passageway between the foundation walls and the outer edges of the benches if two 6' benches were arranged in a greenhouse of that type. If two 6' benches with a 20" passageway were arranged in the greenhouse shown in Fig. 1, there would be no end passage between the foundation wall and the benches to permit easy access to the plants on the benches. In Fig. 2, the glass surface 16 is nothing more than the glass side walls of the conventional greenhouse extended outwardly a predetermined distance. Thus, the glass area of the greenhouse shown in Fig. 2 is not increased to any extent, if at all, over the glass area of conventional greenhouses of the type shown in Fig. 1. Extra benches may therefore be arranged in the new greenhouse construction without increasing the glass area of the greenhouse. In Fig. 2 there may be 20' of benches across the greenhouse if 6' benches are arranged between pilasters 18, and passages on each side of the 6' benches are provided, while there could only be 12' of bench space in the conventional greenhouse with no end passages. Or, if the benches were arranged as shown in Fig. 1, there would be only 10' of bench surface across the greenhouse, while in Fig. 2 there would be 18'—2" of bench space with convenient passages. Therefore, with the glass area remaining the same, a greater amount of bench area is added.

The glass area greatly effects the heating of greenhouses due to the variations of temperatures on the glass. Thus, a greenhouse of larger floor area containing the same amount of glass will accommodate more bench area without increasing the cost of heating.

Furthermore, the space between the pilasters 18 and the foundation walls is relatively close to the glass roof 16 and provides propagation space within the regular greenhouse. Propagation spaces could not be provided within the conventional greenhouses unless the benches were made very high in which case they would cause shadows inside of the greenhouse.

The invention provides a greenhouse which is relatively stronger than conventional greenhouses of the same area without increasing the weight or size of the construction members, and at the same time provides a greenhouse which is much more efficient. A greenhouse constructed in accordance with the invention overcomes the use of gutters and consequently inside shadows caused by the gutters, increases the bench area of the greenhouse without increasing the glass area, and provides for better air circulation and ventilation throughout the greenhouse. Furthermore, a greenhouse of the present type can be constructed at a cost lower than conventional greenhouses.

Changes may be made in the form, construction, and arrangement of the parts without departing from the spirit of the invention or sacrificing any of its advantages, and the right is hereby reserved to make all such changes as fairly fall within the scope of the following claims.

The invention is hereby claimed as follows:

1. A greenhouse comprising a roof having a predetermined pitch, columns supporting said roof, foundation walls, a roof of a sharper pitch than the first named roof arranged between the columns and the foundation walls, benches arranged along the foundation walls under the sharper pitched roof and spaced from the columns to provide a passageway between the columns and the inner edges of the benches, each part of said roof having a pitch less than 45° from horizontal.

2. A greenhouse comprising foundation walls, a roof having a predetermined pitch, side walls for said roof and extended outwardly and supported on the foundation walls to provide a glass roof portion having a greater pitch than the normal pitch of the roof whereby benches placed along the foundation walls of the greenhouse will be relatively close to the glass roof having the greater pitch, the difference in pitch between roof portions being less than 15°.

3. A greenhouse having a continuous unbroken glass roof and glass side walls, the roof extending in sections on opposite sides of the center of the greenhouse, the pitch of each section of the roof being approximately 26° from horizontal, said side walls being extended outwardly and uninterruptedly to provide a roof portion making an angle of from 38° to 45° from horizontal and being of greater pitch than the first named roof, walls supporting the extended side walls and columns supporting said roof.

4. A greenhouse having a glass roof and glass side walls, the pitch of the roof being approximately 26° from horizontal, said side walls being extended outwardly to provide a roof portion making an angle of from 38° to 45° from horizontal and being of greater pitch than the first named roof, walls supporting the extended side walls and columns supporting said roof at a point where the side walls are swung outwardly from the roof, benches arranged along the foundation walls and under the steeper pitched roof and benches arranged inwardly of said columns, there being a passageway between the benches arranged along the foundation walls and those arranged inwardly of the columns.

5. A greenhouse construction comprising a central ridge pole, a roof for said greenhouse and comprising roof sections extending downwardly and outwardly on opposite sides of the ridge pole, foundation walls supporting the ends of said sections, the sections being unbroken but having different pitches, the difference in pitches being less than 15°.

6. A greenhouse construction comprising a foundation wall, greenhouse roof sections extending upwardly in opposite directions from said wall, and a connecting gable at right angles to the longitudinal dimension of said wall connecting said roof sections and providing a connecting passage between adjacent greenhouses.

7. In a greenhouse construction, a common foundation wall supporting the lower ends of roof sections of adjacent greenhouses, a gable connecting said roof sections and extending at right angles to said foundation wall and providing a passage between adjacent greenhouses, said gable being connected to adjacent roof sections.

PHILIP L. McKEE.